US011525048B2

United States Patent
Seo et al.

(10) Patent No.: US 11,525,048 B2
(45) Date of Patent: Dec. 13, 2022

(54) VISIBILITY IMPROVING FILM FOR DISPLAY PANEL AND DISPLAY DEVICE COMPRISING SAME

(71) Applicant: LG CHEM, LTD., Seoul (KR)

(72) Inventors: Kwangseok Seo, Daejeon (KR); Hanna Lee, Daejeon (KR); Jinseok Byun, Daejeon (KR); Yeongrae Chang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 16/767,742

(22) PCT Filed: Nov. 28, 2018

(86) PCT No.: PCT/KR2018/014848
§ 371 (c)(1),
(2) Date: May 28, 2020

(87) PCT Pub. No.: WO2019/107928
PCT Pub. Date: Jun. 6, 2019

(65) Prior Publication Data
US 2021/0070963 A1 Mar. 11, 2021

(30) Foreign Application Priority Data
Nov. 28, 2017 (KR) ........................ 10-2017-0160636

(51) Int. Cl.
*C08K 3/40* (2006.01)
*C08K 3/08* (2006.01)
*B32B 27/20* (2006.01)
*G02B 5/02* (2006.01)

(52) U.S. Cl.
CPC ................ *C08K 3/40* (2013.01); *B32B 27/20* (2013.01); *C08K 3/08* (2013.01); *G02B 5/0242* (2013.01); *G02B 5/0284* (2013.01); *B32B 2264/101* (2013.01); *B32B 2264/102* (2013.01); *B32B 2457/20* (2013.01); *C08K 2003/0806* (2013.01)

(58) Field of Classification Search
CPC .......... G02B 5/02; G02B 5/0284; G02B 1/111
See application file for complete search history.

(56) References Cited

U.S. PATENT DOCUMENTS

| 7,226,503 B2 * | 6/2007 | Anselmann | ........... | C09C 1/0015 |
| | | | | 106/415 |
| 2005/0158526 A1 * | 7/2005 | Ino | ........................ | C09D 5/22 |
| | | | | 428/207 |

| 2009/0231713 A1 | 9/2009 | Takada |
| 2015/0116648 A1 | 4/2015 | Shin et al. |
| 2016/0187663 A1 | 6/2016 | Kim et al. |
| 2017/0351009 A1 | 12/2017 | Matsuo et al. |
| 2018/0292582 A1 | 10/2018 | Matsuo et al. |
| 2018/0348411 A1 | 12/2018 | Yamaki et al. |
| 2019/0224942 A1 | 7/2019 | Matsuo et al. |

FOREIGN PATENT DOCUMENTS

| EP | 3385787 A1 | 10/2018 |
| JP | 2004-302223 A | 10/2004 |
| JP | 2008-221746 A | 9/2008 |
| JP | 2008-257041 A | 10/2008 |
| JP | 2009-217065 A | 9/2009 |
| JP | 2009-244582 A | 10/2009 |
| JP | 2011-033812 A | 2/2011 |
| KR | 10-2011-0001983 A | 1/2011 |
| KR | 10-1107532 B1 | 1/2012 |
| KR | 10-2015-0025834 A | 3/2015 |
| KR | 10-2015-0057474 A | 5/2015 |
| KR | 10-2015-0086663 A | 7/2015 |
| KR | 10-2016-0143677 A | 12/2016 |
| TW | 200951482 A | 12/2009 |
| WO | 2015-030428 A1 | 3/2015 |
| WO | 2015-156333 A1 | 10/2015 |
| WO | 2016-104112 A1 | 6/2016 |
| WO | 2016-204009 A1 | 12/2016 |
| WO | 2017-094550 A1 | 6/2017 |
| WO | 2018-012433 A1 | 1/2018 |

OTHER PUBLICATIONS

Machine translation of JP WO 2016/204009 A1, 28 pages. Dec. 22, 2016 (Year: 2016).*
Extended European Search Report dated Nov. 20, 2020, of the corresponding European Patent Application No. 18884235.5, 10 pages.
Anonymous: "Luminance—Wikipedia, the free encyclopedia", Feb. 19, 2016, 3 pages.
Search Report issued for corresponding PCT Patent Application No. PCT/KR2018/014848 dated Mar. 29, 2019, 4 pages.

* cited by examiner

*Primary Examiner* — Cheng Yuan Huang
(74) *Attorney, Agent, or Firm* — Rothwell, Figg, Ernst & Manbeck, P.C.

(57) ABSTRACT

The present invention relates to a visibility improving film for a display panel and a display device including the same. More specifically, the present invention relates to a visibility improving film for a display panel capable of exhibiting excellent physical and optical properties particularly while enhancing the visibility of a laser pointer, by including metal-coated inorganic oxide fine particles dispersed in the photocurable resin layer, and a display device including the same.

11 Claims, No Drawings

VISIBILITY IMPROVING FILM FOR DISPLAY PANEL AND DISPLAY DEVICE COMPRISING SAME

CROSS-REFERENCE TO RELATED APPLICATION(S)

This application is a 35 U.S.C. 371 National Phase Entry Application from PCT/KR2018/014848 filed on Nov. 28, 2018, designating the United States and which claims the benefits of filing dates of Korean Patent Application No. 10-2017-0160636 filed on Nov. 28, 2017, the entire contents of which are incorporated herein by reference.

TECHNICAL FIELD

The present invention relates to a visibility improving film for a display panel and a display device including the same.

More specifically, the present invention relates to a visibility improving film for a display panel capable of exhibiting excellent optical properties such as luminance and contrast ratio particularly while enhancing the visibility of a laser pointer, by including metal-coated inorganic oxide fine particles having a specific size and shape, and a display device including the visibility improving film for a display panel.

BACKGROUND OF THE INVENTION

For a presentation in, for example, lectures, conferences, or announcements, it is common for material images to be reproduced using a display device and for the presenter to give a presentation while pointing to a screen or the like using a laser pointer at a certain position on a presentation image.

Conventionally, the presentation is often performed by projecting material images on a screen or wall using a beam projector. However, in the case of the projector system, there are disadvantages in that the contrast ratio and image quality are not good. Recently, a high number of large-sized display panels with various driving methods such as LCDs, PDPs, and OLEDs have been supplied, and thereby it is becoming possible to make presentations by displaying images directly on the displays.

However, the display device has light emission characteristics, and there is no factor that can scatter the laser light in addition to specular reflection at a specific angle. This causes a problem in that the visibility of the laser pointer is remarkably deteriorated.

Therefore, there is still a need to develop a method for enhancing the visibility of a laser pointer in a display device without requiring excessive additional steps.

BRIEF SUMMARY OF THE INVENTION

The present invention provides a visibility improving film for a display panel capable of exhibiting excellent physical and optical properties while enhancing the visibility of a laser pointer at a low cost in a display panel such as an LCD, a PDP, and an OLED, and a display device including the same.

The present invention provides a visibility improving film for a display panel, including: a substrate; and a photocurable resin layer that is provided on at least one side of the substrate, wherein the photocurable resin layer includes metal-coated inorganic oxide fine particles having an average particle size of 1 to 10 µm in a dispersed form, and wherein a relative visibility evaluation value represented by the following Formula 1 is 4 or more, Visibility Evaluation Value=$B1/A1$ [Formula 1]

wherein, in the above Formula 1,

A1 is a luminance value measured from the front side, when a film having transmittance of 80 to 100 as measured according to JIS K 7361 and a haze value of 20 to 25 as measured according to JIS K 7136 is bonded to a glass slide, then placed on a black acrylic plate and irradiated with laser light at 45° with respect to the normal direction, and B1 is a luminance value measured from the front side, when the visibility improving film for a display panel is bonded to a glass slide, then placed on a black acrylic plate and irradiated with the same laser light at 45° with respect to the normal direction.

The present invention also provides a display device including a display panel and the above-mentioned visibility improving film for the display panel.

Advantageous Effects

The visibility improving film for a display panel according to the present invention can remarkably enhance the visibility of a laser pointer, which is deteriorated on a display device.

In addition, such an effect can be obtained by applying it in the form of a film to the outside of the display panel without changing the display driving method, the color filter inside the panel, the laminated structure, or the like, and therefore production costs can be reduced since excessive process modification or cost increases are not required.

DETAILED DESCRIPTION OF THE INVENTION

The visibility improving film for a display panel according to the present invention includes: a substrate; and a photocurable resin layer that is provided on at least one side of the substrate, wherein the photocurable resin layer includes metal-coated inorganic oxide fine particles having an average particle size of 1 to 10 µm in a dispersed form, and wherein a relative visibility evaluation value represented by the following Formula 1 is 4 or more, Visibility Evaluation Value=$B1/A1$ [Formula 1]

wherein, in the above Formula 1,

A1 is a luminance value measured from the front side, when a film having transmittance of 80 to 100 as measured according to JIS K 7361 and a haze value of 20 to 25 as measured according to JIS K 7136 is bonded to a glass slide, then placed on a black acrylic plate and irradiated with laser light at 45° with respect to the normal direction, and B1 is a luminance value measured from the front side, when the visibility improving film for a display panel is bonded to a glass slide, then placed on a black acrylic plate and irradiated with the same laser light at 45° with respect to the normal direction.

In addition, the display device of the present invention includes a display panel and the above-mentioned visibility improving film for the display panel.

In the present invention, the term 'upper surface' means a surface arranged to face a viewer when the film is mounted on a display panel, and the term 'upper' means a direction toward the viewer. Conversely, the term 'lower surface' or 'lower' means a surface or a direction arranged to face a side opposite to a viewer when the film is mounted on a display panel.

In the present invention, simply, the haze value or the total haze value means a haze value (Ht) measured with respect to the film itself without any further treatment on the film. The total haze value (Ht) represents the sum of the haze value due to surface unevenness of the film and the haze value due to particles or the like contained in the film.

Further, the terms used herein are used only to explain illustrative examples, and are not intended to limit the invention. A singular expression includes a plural expression unless clearly meaning otherwise. It should be understood that the terms 'comprise', 'include', and 'have' as used herein are intended to designate the presence of stated features, numbers, steps, constitutional elements, or combinations thereof, but it should be understood that they do not preclude the possibility of existence or adding of one or more other features, numbers, steps, constitutional elements, or combinations thereof.

Further, in the present invention, in case a layer or an element is mentioned to be formed 'on' or 'above' another layer or element, it means that the layer or element is directly formed on the other layer or element, or it means that another layer or element may be additionally formed between layers or on a subject or substrate.

Since a variety of modification may be made to the present invention and there may be various forms of the present invention, specific examples are illustrated and will be described in detail below. However, it should be understood that this is not intended to limit the present invention to particular forms disclosed herein, and the invention compasses all modifications, equivalents, or alternatives falling within the spirit and technical scope of the present invention.

Hereinafter, the visibility improving film for a display panel and the display device including the same according to embodiments of the present invention will be described in more detail.

According to embodiments of the present invention, a visibility improving film for a display panel is provided, including: a substrate; and a photocurable resin layer that is provided on at least one side of the substrate, wherein the photocurable resin layer includes metal-coated inorganic oxide fine particles having an average particle size of 1 to 10 μm in a dispersed form, and wherein a relative visibility evaluation value represented by the following Formula 1 is 4 or more, Visibility Evaluation Value=$B1/A1$  [Formula 1]

wherein, in the above Formula 1,

A1 is a luminance value measured from the front side, when a film having transmittance of 80 to 100 as measured according to JIS K 7361 and a haze value of 20 to 25 as measured according to JIS K 7136 is bonded to a glass slide, then placed on a black acrylic plate and irradiated with a laser light at 45° with respect to the normal direction, and B1 is a luminance value measured from the front side, when the visibility improving film for a display panel is bonded to a glass slide, then placed on a black acrylic plate and irradiated with the same laser light at 45° with respect to the normal direction.

The visibility improving film for a display panel formed by using the coating composition according to the present invention can exhibit characteristic reflection/scattering properties with respect to light in a wavelength range used for a laser pointer, and thus can contribute to improvement of the visibility of the laser pointer.

Such a visibility improving film for a display panel includes a cured product of a binder containing a photocurable functional group, and metal-coated inorganic oxide fine particles that are dispersed in the photocurable binder.

The metal-coated inorganic oxide fine particles refer to a kind of core-shell-type particles in which inorganic oxide fine particles such as glass are contained in a central portion and metal coating is performed in a form of surrounding the particles so that the glass component is not exposed to the outside.

Commonly used films for display panels include at least one substrate selected from the group consisting of glass, a polyester such as polyethylene terephthalate (PET), a polyethylene such as ethylene vinyl acetate (EVA), cyclic olefin polymer (COP), cyclic olefin copolymer (COC), polyacrylate (PAC), polycarbonate (PC), polyethylene (PE), poly (methylmethacrylate) (PMMA), polyether ether ketone (PEEK), polyethylene naphthalate (PEN), polyetherimide (PEI), polyimide (PI), MMA (methyl methacrylate), a fluorocarbon resin, triacetylcellulose (TAC), and the like.

Among these substrates, triacetylcellulose (TAC) films are particularly excellent in optical properties and thus are frequently used.

According to one embodiment of the invention, the photocurable resin layer may be formed on one side or both sides of the substrate. In particular, when the resin layer is formed so as to be on the side of the upper portion of the substrate, that is, in the direction of the viewer, the resin layer can also serve as a hard coating layer.

According to one embodiment of the invention, a photocurable resin layer is formed by coating and ultraviolet-curing on a substrate, and a coating composition laminated on at least one side of a display panel, which can be used for a visibility improving film for a display panel, is used.

The coating composition for producing the visibility improving film for a display panel of the present invention may include: a binder containing a photocurable functional group; metal-coated inorganic oxide fine particles dispersed in the binder and having a particle size of 1 to 10 μm; a photo-polymerization initiator; solvents; etc.

The binder containing the photo-curable functional group is not particularly limited as long as it is a compound containing an unsaturated functional group capable of causing a polymerization reaction by ultraviolet rays, but it may be a compound containing a (meth)acrylate group, an allyl group, an acryloyl group, or a vinyl group as the photo-curable functional group. According to one embodiment of the invention, the binder containing the photo-curable functional group may be at least one selected from the group consisting of a multifunctional acrylate-based monomer, a multifunctional acrylate-based oligomer, and a multifunctional acrylate-based elastic polymer.

In the present invention, the acrylate-based refers not only to acrylates, but also to methacrylates, or derivatives of acrylates or methacrylates having substituents introduced therein.

The multifunctional acrylate-based monomer means a monomer containing two or more acrylate-based functional groups. More specific examples thereof may include hexanediol diacrylate (HDDA), tripropylene glycol diacrylate (TPGDA), ethylene glycol diacrylate (EGDA), trimethylolpropane triacrylate (TMPTA), trimethylolpropane ethoxy triacrylate (TMPEOTA), glycerin propoxylated triacrylate (GPTA), pentaerythritol tri(tetra)acrylate (PETA), dipentaerythritol hexaacrylate (DPHA), or the like, but the coating composition of the present invention is not limited thereto. The multifunctional acrylate-based monomer performs a role of providing certain pencil strength and abrasion resistance to the film by being cross-linked.

The multifunctional acrylate-based monomer may be used either alone or as a combination of different types.

The multifunctional acrylate-based oligomer is an oligomer having two or more acrylate functional groups, and may have a weight average molecular weight in a range of about 1000 to about 10,000 g/mol, about 1000 to about 5000 g/mol, or about 1000 to about 3000 g/mol.

Further, according to one embodiment of the present invention, the multifunctional acrylate-based oligomer may be an acrylate-based oligomer modified with one or more types of urethane, ethylene oxide, propylene oxide, and caprolactone. When using the modified multifunctional acrylate-based oligomer, flexibility is further imparted to the multifunctional acrylate-based oligomer due to modification and thus a curl property and flexibility of a protective film can be increased.

The multifunctional acrylate-based oligomer may be used either alone or as a combination of different types.

The multifunctional acrylate-based elastic polymer is excellent in flexibility and elasticity, and is a polymer containing two or more acrylate functional groups, which may have a weight average molecular weight ranging from about 100,000 to about 800,000 g/mol, from about 150,000 to about 700,000 g/mol, or from about 180,000 to about 650,000 g/mol.

A protective film formed by using a coating composition including the multifunctional acrylate-based elastic polymer may secure high elasticity or flexibility while securing mechanical properties, and may minimize curl or crack occurrences.

Another example of the multifunctional acrylate-based elastic polymer may include a urethane-based acrylate polymer. The urethane-based acrylate polymer has a form of a urethane-based acrylate oligomer being linked to an acrylic polymer main chain as a side branch.

Meanwhile, according to one embodiment of the present invention, the coating composition can exhibit characteristic light scattering properties of a laser pointer by including metal-coated inorganic oxide fine particles.

When the coating composition includes metal-coated inorganic oxide fine particles, the photocurable resin layer cured by using this can effectively reflect and scatter a laser light used for the laser pointer, thereby enhancing the visibility.

Generally, when producing a film or the like for a display panel, inorganic fine particles such as organic particles or metal oxides are often used in the coating composition or the like. This is because the corresponding particles have high transmittance.

Such transmissive particles and the like cause light scattering mainly by refraction and diffraction, while the metal particles reflect light. More specifically, in the case of the transmissive particles, light scattering due to diffraction and refraction occurs consecutively along the path along which the light travels. Consequently, the light spreads and cloudy light appears. However, in the case of metal particles, since light scattering occurs due to reflection without transmitting light, light scattering does not occur consecutively along the path along which the light travels, and the light spreading phenomenon does not occur.

In particular, when metal oxide-based inorganic particles such as titanium dioxide ($TiO_2$) particles having a large difference in refractive index from the binder are used, a high light scattering effect can be obtained, but there is a disadvantage that the contrast ratio is greatly lowered due to high transmittance of the particles.

The contrast ratio of the display device is caused by the difference between the luminance of the image coming from the display panel and the luminance difference due to the film. In the case of using the transmissive particles, the luminance in the film is increased by the particles, and eventually, the difference in luminance between the panel and film becomes low and thus the contrast ratio is lowered.

Therefore, the film for a display panel according to the embodiment of the present invention can enhance the visibility of laser pointer light by using metal-coated inorganic oxide fine particles, and at the same time, realize a high contrast ratio.

In particular, in the case of the metal-coated inorganic oxide fine particles, there is an advantage that the price is relatively cheap and the visibility is increased as compared with the metal particles. In addition, there is an advantage that the shape of the particles themselves can be easily controlled according to the shape of inorganic oxide fine particles such as glass contained therein, and thereby the visibility can be enhanced without impairing other optical properties such as a haze value of the film.

The average particle size of the metal-coated inorganic oxide fine particles may be 1 µm or more from the viewpoint of optimizing the light scattering effect, and it can be a particle with a size of 10 µm or less, more preferably about 3 to about 7 µm, or about 4 to about 6 µm, from the viewpoint of making the haze and coating thickness appropriate.

When the average particle size of the metal-coated inorganic oxide fine particles is too small, the effect of enhancing the visibility of a laser pointer light due to scattering of light may be insignificant, and when the average particle size of the metal-coated inorganic oxide fine particles is too large, a protrusion is formed on the surface of the film, which may cause a decrease in optical properties such as transparency and transmittance.

The average particle size of the metal-coated inorganic oxide fine particles can be determined by confirming the particle sizes of all the metal-coated inorganic oxide fine particles contained in the resin layer. The particle size of the metal-coated inorganic oxide fine particles can be confirmed by the cross-section of the resin layer or the like. Further, the average particle size of the metal-coated inorganic oxide fine particles can be confirmed through the particle sizes of the entire metal-coated inorganic oxide fine particles or their average particle sizes used in the production of the resin layer.

The metal-coated inorganic oxide fine particles may be a group of individual fine particles having an average particle size of 1 to 10 µm, and the individual fine particles contained in this group may have a particle size of 0.05 to 50 µm. More specifically, 95% or 99% of the individual fine particles contained in the group may have a particle size of 0.05 to 50 µm.

More specific examples of the fine particles satisfying these conditions may include particles in which one or more metals selected from the group consisting of aluminum, gold, silver, magnesium, platinum, copper, titanium, zirconium, nickel, tin, silicon, and chromium are formed so as to surround the inorganic oxide core, and the like, but the present invention is not necessarily limited thereto.

Further, the metal-coated inorganic oxide fine particles may be in a form containing about 5 to about 50 wt % of a metal component.

According to one embodiment of the present invention, when the total weight of the binder containing a photocurable functional group is taken as 100 parts by weight, the metal-coated inorganic oxide fine particles may be contained in an amount of about 1 to about 20 parts by weight, or about 1 to about 10 parts by weight, preferably about 1 to about 5 parts by weight, most preferably about 1.15 to about 3 parts by weight.

When the metal-coated inorganic oxide fine particles are contained in an excessively small amount, the light reflection effect at the corresponding wavelength is insignificant and thus the effect of enhancing the visibility of the laser pointer may not be sufficient. When the fine metal particles are contained in an excessively large amount, color reproducibility and luminance of the display device may be lowered, and other physical properties of the coating composition may be deteriorated. In this respect, it is preferable to be included in the above range.

In this case, the metal-coated inorganic oxide fine particles are plate-like particles having an average particle size of about 1 to about 7 μm and a flattening ratio of about 0.5 or more, preferably about 0.7 or more, or about 0.9 or less.

The 'flattening ratio' is referred to as ellipticity, and is the amount indicating the degree of flatness of a three-dimensional rotating ellipsoid. It is a value represented by (a-b)/a when the long diameter is a and the short radius is b. The flattening ratio of a sphere is 0, and the flattening ratio of a plane is 1.

When the value of the flattening ratio is too small, the scattering efficiency relative to the content of the metal-coated inorganic oxide fine particles is lowered, which may cause a problem that the visibility is not effectively increased.

Meanwhile, these metal-coated inorganic oxide fine particles may be used alone, but when mixed in the photocurable resin layer, it may be more preferable to use them in a form in which they are previously dispersed in the dispersion from the viewpoint of enhancing the dispersibility.

Examples of the photo-polymerization initiator contained in the coating composition of the present invention may include, but are not limited to, 1-hydroxy-cyclohexyl-phenyl ketone, 2-hydroxy-2-methyl-1-phenyl-1-propanone, 2-hydroxy-1-[4-(2-hydroxyethoxy)phenyl]-2-methyl-1-propanone, methyl benzoylformate, α,α-dimethoxy-α-phenylacetophenone, 2-benzoyl-2-(dimethylamino)-1-[4-(4-morpholinyl)phenyl]-1-butanone, 2-methyl-1-[4-(methylthio)phenyl]-2-(4-morpholinyl)-1-propanone diphenyl(2,4,6-trimethylbenzoyl)-phosphine oxide, bis(2,4, 6-trimethylbenzoyl)-phenylphosphine oxide, and the like. In addition, examples of products now commercially available may include Irgacure 184, Irgacure 500, Irgacure 651, Irgacure 369, Irgacure 907, Darocur 1173, Darocur MBF, Irgacure 819, Darocur TPO, Irgacure 907, Esacure KIP 100F, or the like. These photo-polymerization initiators may be used alone or in combination of two or more kinds.

According to one embodiment of the present invention, the content of the photo-polymerization initiator is not particularly limited, but it may be used in an amount of about 0.1 to about 10 parts by weight, based on 100 parts by weight of the total weight of the binder containing the photocurable functional group, without deteriorating physical properties of the total coating composition.

The organic solvent contained in the coating composition of the present invention may be an alcohol solvent such as methanol, ethanol, isopropyl alcohol, and butanol; an alkoxy alcohol solvent such as 2-methoxyethanol, 2-ethoxyethanol, and 1-methoxy-2-propanol; a ketone solvent such as acetone, methyl ethyl ketone, methyl isobutyl ketone, methyl propyl ketone, and cyclohexanone; an ether solvent such as propylene glycol monopropyl ether, propylene glycol monomethyl ether, ethylene glycol monoethyl ether, ethylene glycol monopropyl ether, ethylene glycol monobutyl ether, diethylene glycol monomethyl ether, diethyl glycol monoethyl ether, diethyl glycol monopropyl ether, diethyl glycol monobutyl ether, and diethylene glycol-2-ethylhexyl ether; and an aromatic solvent such as benzene, toluene, and xylene; and they may be used alone or in combination thereof.

According to one embodiment of the present invention, the content of the organic solvent may be variously adjusted within a range that does not deteriorate the physical properties of the coating composition, but the organic solvent may be used in an amount of about 50 to about 200 parts by weight, preferably about 100 to about 200 parts by weight, based on 100 parts by weight of the binder containing the photocurable functional group. When the amount of organic solvent is within the above ranges, it may exert appropriate fluidity and coatability.

Meanwhile, the coating composition of the present invention may further include an additive commonly used in the art to which the present invention pertains, such as a surfactant, an antioxidant, a UV stabilizer, a leveling agent, or an antifouling agent, in addition to the above-described components. Here, the content thereof may be variously adjusted within a range that does not deteriorate the physical properties of the coating composition of the present invention. Thus, there is no particular limitation thereto, but for example, it may be included in an amount of about 0.1 to about 10 parts by weight based on 100 parts by weight of the total coating composition.

According to one embodiment of the present invention, the photocurable resin layer formed by using the coating composition may have a thickness of about 2 to 20 μm after drying and curing. Appropriate optical and physical properties can be exhibited within the thickness range as above.

The visibility improving film for a display panel of the present invention as described above can be formed by coating a coating composition onto a transparent plastic substrate and photo-curing the coating composition.

Specific descriptions and examples of the coating composition and each component constituting the composition are the same as described above.

The method of coating the coating composition is not particularly limited as long as it may be used in the art to which the present technology belongs. For example, a bar coating method, a knife coating method, a roll coating method, a blade coating method, a die coating method, a microgravure coating method, a comma coating method, a slot die coating method, a lip coating method, a solution casting method, or the like may be used.

Next, a protective film may be formed by carrying out a photocuring reaction through irradiating ultraviolet rays on the coated composition. The coated surface of the composition is flattened before irradiating the ultraviolet rays, and a drying step for volatizing a solvent included in the composition may be further carried out.

The amount of the ultraviolet irradiation may be, for example, from about 20 to about 600 mJ/cm2. The light source of the ultraviolet irradiation is not particularly limited as long as it is capable of being used in the art, and examples thereof may include a high pressure mercury lamp, a metal halide lamp, a black light fluorescent lamp, and the like.

The visibility improving film for a display panel of the present invention includes metal-coated inorganic oxide fine particles having a specific shape as described above, and can effectively reflect laser light made incident on the liquid crystal display by means of a laser pointer. Therefore, it is possible to provide a display device capable of realizing excellent image quality with high luminance and contrast ratio, while enhancing the visibility of a laser pointer.

The visibility improving film for a display panel may have a relative visibility evaluation value represented by the following Formula 1 of 4 or more.

$$\text{Visibility Evaluation Value} = B1/A1 \quad \text{[Formula 1]}$$

In the above Formula 1,

A1 is a luminance value measured from the front side, when a film having transmittance of 80 to 100 as measured according to JIS K 7361 and a haze value of 20 to 25 as measured according to JIS K 7136, more preferably a film having transmittance of 90 to 95 and a haze value of 22 to 25, most preferably a film having transmittance of about 90 and a haze value of about 22, is bonded to a glass slide, then placed on a black acrylic plate and irradiated with a laser light at 45° with respect to the normal direction, and B1 is a luminance value measured from the front side, when the visibility improving film for a display panel is bonded to a glass slide, then placed on a black acrylic plate and irradiated with the same laser light at 45° with respect to the normal direction.

As described above, the visibility improving film for a display panel of the present invention can realize an effect of increasing the luminance by about 50% or more, preferably about 60% or more, relative to a general photocurable coating layer, due to the scattering/reflection light by the metal-coated inorganic oxide fine particles, as compared with the case of using a general UV curable coating layer, and thereby the visibility of the laser pointer can be remarkably improved.

In addition, the visibility improving film for a display panel may have excellent optical properties, for example, may have a value of luminance ratio represented by the following Formula 2 of about 80% or more, and preferably about 85 to about 95%.

$$\text{Luminance Ratio} = (B2/A2)*100 \quad \text{[Formula 2]}$$

In the above Formula 2,

A2 is a luminance value measured from the front side, when a film having transmittance of 80 to 100 as measured according to JIS K 7361 and a haze value of 20 to 25 as measured according to JIS K 7136, more preferably a film having transmittance of 90 to 95 and a haze value of 22 to 25, and most preferably a film having transmittance of about 90 and a haze value of about 22, is bonded to a glass slide and then placed on a backlight surface, and B2 is a luminance value measured from the front side, when the visibility improving film for a display panel is bonded to a glass slide and then placed on a backlight surface.

Further, the visibility improving film for a display panel may have a white turbidity ratio value represented by the following Formula 3 of 10 or less, preferably about 5 or less.

$$\text{White Turbidity Ratio} = B3/A3 \quad \text{[Formula 3]}$$

In the above Formula 3,

A3 is a luminance value (cd/m2) measured at a height of 7 cm from the front side, when a film having transmittance of 80 to 100 as measured according to JIS K 7361 and a haze value of 20 to 25 as measured according to JIS K 7136, more preferably a film having transmittance of 90 to 95 and a haze value of 22 to 25, and most preferably a film having transmittance of about 90 and a haze value of about 22, is bonded to a glass slide, then placed on a black acrylic plate and kept under the condition of 9 lx, and B3 is a luminance value (cd/m2) measured at a height of 7 cm from the front side, when the visibility improving film for a display panel is bonded to a glass slide, then placed on a black acrylic plate and kept under the condition of 9 lx.

Further, the visibility improving film for a display panel may have high light transmittance, which is transmittance measured according to JIS K 7361, of about 80% or more, preferably about 80 to about 90%.

Further, the visibility improving film for a display panel may have an internal haze value measured according to JIS K 7136 of about 15% or less, or about 1 to about 11%.

In an optical film or the like, the transmittance and the haze properties are changed depending on the introduced particles contained in the film. Generally, the greater the amount of the light scattering particles having similar optical properties, the greater the tendency of the transmittance is of being lowered and the haze being increased.

However, depending on the type of particles used, it is possible to have a characteristic relationship between transmittance and haze. In particular, when the metal-coated inorganic oxide fine particles are contained in the resin layer, they have the reflection characteristics as described above, and thus can show a lower haze value than that of the organic fine particles or the inorganic oxide fine particles commonly used in the art, while decreasing light transmittance. In particular, when compared with the case of using the transmissive light scattering particles, even if they show the same transmittance value, there is a feature that they can have a relatively low haze value.

In particular, the light transmittance value varies depending on the content of particles. When the transmittance is too high, there is a problem that the amount of particles for scattering or reflecting light is absolutely deficient, thereby failing to realize appropriate visibility. When the transmittance is too low, the visibility is good, but the contrast ratio and luminance are lowered, which may cause a problem that the image quality of the image to be mounted on the display deteriorates.

Therefore, by limiting the range of the above-described transmittance (Tt), and the characteristic haze value attributable to the use of metal-coated inorganic oxide fine particles, it can exhibit excellent visibility in the use of the laser pointer and at the same time realize an excellent contrast ratio.

In the visibility improving film for a display panel according to the present invention, the substrate on which the resin layer is formed may be glass or a transparent plastic resin which is commonly used for a display panel. More specifically, according to one embodiment of the present invention, the substrate may include a polyester such as polyethylene terephthalate (PET), a polyethylene such as ethylene vinyl acetate (EVA), a cyclic olefin polymer (COP), a cyclic olefin copolymer (COC), polyacrylate (PAC), polycarbonate (PC), polyethylene (PE), poly(methylmethacrylate) (PMMA), polyether ether ketone (PEEK), polyethylene naphthalate (PEN), polyetherimide (PEI), polyimide (PI), MMA (methyl methacrylate), a fluorocarbon resin, triacetylcellulose (TAC), or the like.

Preferably, the substrate may be a film including triacetyl cellulose (TAC).

The thickness of the substrate is not particularly limited, but it is possible to use a substrate having a thickness of about 20 to about 100 μm, or about 20 to about 60 μm, which is within a range capable of satisfying the hardness and other physical properties of the film.

The visibility improving film for a display panel according to the present invention may have pencil hardness of HB or more, 1H or more, or 2H or more, at a load of 500 g.

In addition, when steel wool #0 is attached to a friction tester and then reciprocated 10 times with a load of 200 g, a load of 300 g, or a load of 400 g, it can exhibit wear resistance such that scratches do not occur.

According to one embodiment of the present invention, the visibility improvement film for a display panel may be in a form further including: a substrate; a resin layer provided on the substrate; and at least one functional coating layer of the antireflection layer and the antiglare layer, which are formed on the resin layer.

In addition to the antireflection effect in the existing display panel film, as specular reflection is prevented when using a laser pointer, the laser pointer light is specularly reflected, thereby effectively preventing it from directly entering the eye of a viewer viewing the image. As such antireflection layer, a general antireflection layer which is used in a film for an existing display device or an optical film for a polarizing plate, specifically, for example, an antireflection layer or an antireflection coating (AR) that utilizes interference of light by forming a plurality of layers having different refractive indexes, may be used without particular limitation.

Further, the anti-glare layer allows the laser pointer light to diffusely reflect due to the surface unevenness when using a laser pointer, and thereby it can effectively prevent the reflection light from directly entering the eye of a viewer viewing the image. In such anti-glare layer, a method of dispersing a filler such as inorganic fine particles in a resin and imparting unevenness to the surface (anti-glare, AG) and the like can be used without particular limitation.

When the antireflection layer and the antireflection layer are provided, such a functional coating layer may be preferably located at the top of the film.

Meanwhile, according to another embodiment of the present invention, a display device including a display panel and the above-mentioned visibility improving film for the display panel is provided.

In this case, the display panel is not particularly limited to a driving method or structure, and it can be applied to all of LCD panels, PDP panels, and OLED panels.

The visibility improving film for a display panel and the display panel may be adhered through lamination using a separate adhesive and the like. The adhesive capable of being used herein is not particularly limited as long as it is known in the art. Examples thereof may include water-based adhesives, one component or two component polyvinyl alcohol (PVA)-based adhesives, polyurethane-based adhesives, epoxy-based adhesives, styrene butadiene rubber (SBR)-based adhesives, hot melt-type adhesives, or the like, but the present disclosure is not limited to these examples.

Further, the fact that the resin layer may also serve as an adhesive layer is as described above. When the resin layer does not serve as the adhesive layer, the substrate surface on which the resin layer is not formed adheres to the display panel side, and the resin layer is laminated so as to be located toward the outside, and thereby it may be preferable to form a structure for directly facing the surface to which the laser pointer is made incident.

Hereinafter, actions and effects of the present invention will be described in more detail through specific examples, but these examples are given to merely illustrate the invention and are not intended to limit the scope of the invention thereto.

Example

Pentaerythritol tri(tetra)acrylate as a binder component having a photocurable functional group (hereinafter referred to as PETA), EBECRYL 1290 (Allnex) which is hexafunctional urethane acrylate (hereinafter referred to as 6UA), Irgacure 184 as a photopolymerization initiator (hereinafter referred to as the initiator), T270 (manufactured by TEGO, polyether siloxane copolymer) as an additive (hereinafter referred to as the additive), and 2-BuOH and methyl ethyl ketone (hereinafter referred to as MEK) as an organic solvent, were mixed to prepare a coating composition according to the composition ratio shown in Table 1 below.

In the examples, as the metal-coated inorganic oxide fine particles, SG05TF40 (silver content: 40 wt %, average particle size: 5 μm, specific gravity: 3.5 g/cc) which is thin glass flake silver particles (manufactured by Potters Industries Inc.) was used (hereinafter referred to as S-G, used as a toluene dispersion having a solid content of 10 wt %).

In the case of Comparative Examples 1 to 3, SFTP-0010 (average particle size: 0.7 μm, flattening ratio: 0.5 or less) which is a silver particle (manufactured by Ames Advanced Materials) was subjected to ultrasonic treatment and used (hereinafter referred to as S, used as a toluene dispersion having a solid content of 10 wt %).

In the case of Comparative Examples 4 to 6, TS-6200 (average particle size: 0.39 μm) which is titania particles (manufactured by Chemours) was used (hereinafter referred to as T, used as a butyl cellosolve dispersion having a solid content of 6.3 wt %).

In the case of Comparative Examples 8 and 9, as the metal-coated inorganic oxide fine particles, SG05TF40 (silver content: 40 wt %, average particle size: 5 μm, specific gravity: 3.5 g/cc) which is thin glass flake silver particles (manufactured by Potters Industries Inc.) was used (hereinafter referred to as S-G, used as a toluene dispersion having a solid content of 10 wt %).

The coating composition was coated on a substrate TAC (thickness: 80 μm) using a bar, dried at 90° C. for 2 minutes and 30 seconds, and then cured with a mercury lamp (at about 200 mJ/cm2) to produce a visibility improving film for a display panel having an average dry thickness of about 4 to about 5 μm.

An A25 film (LG Chem), which is an anti-glare film having Tt value of about 90 as measured according to JIS K 7361 and a haze value of about 22 as measured according to JIS K 7136 was prepared as Comparative Example 7.

TABLE 1

| Note | PETA | 6UA | Initiator | Additive | 2-BuOH | MEK | |
|---|---|---|---|---|---|---|---|
| Example 1 (100) | 20.09 | 20.09 | 3.1 | 0.43 | 21 | 21 | (S-G) 14.29 |
| Example 2 (100.01) | 19.53 | 19.53 | 3.02 | 0.42 | 20.42 | 20.42 | (S-G) 16.67 |
| Example 3 (100.02) | 17.58 | 17.58 | 2.72 | 0.38 | 18.38 | 18.38 | (S-G) 25 |
| Example 4 (100) | 16.74 | 16.74 | 2.59 | 0.36 | 17.5 | 17.5 | (S-G) 28.57 |
| Comparative Example 1 (99.99) | 22.68 | 22.68 | 3.5 | 0.48 | 23.71 | 23.71 | (S) 3.23 |

TABLE 1-continued

| Note | PETA | 6UA | Initiator | Additive | 2-BuOH | MEK | | |
|---|---|---|---|---|---|---|---|---|
| Comparative Example 2 (99.99) | 21.31 | 21.31 | 3.29 | 0.45 | 22.27 | 22.27 | (S) | 9.09 |
| Comparative Example 3 (100) | 20.09 | 20.09 | 3.1 | 0.43 | 21 | 21 | (S) | 14.29 |
| Comparative Example 4 (100) | 22.5 | 22.5 | 3.5 | 0.5 | 22.78 | 25 | (T) | 3.22 |
| Comparative Example 5 (100) | 20.5 | 20.5 | 3.1 | 0.5 | 21.2 | 22.6 | (T) | 11.6 |
| Comparative Example 6 (100) | 20 | 20 | 3 | 0.4 | 20.3 | 22 | (T) | 14.3 |
| Comparative Example 7 | | | | A25 | | | | |
| Comparative Example 8 (100) | 20.83 | 20.83 | 3.21 | 0.43 | 21.75 | 21.75 | (S-G) | 11.2 |
| Comparative Example 9 (100) | 21.35 | 21.35 | 3.21 | 0.43 | 22.38 | 22.38 | (S-G) | 8.9 |

*Content unit: part by weight

Measurement of Tt Value

The transmittance values (Tt) of the visibility improving films for display panels produced in the examples and comparative examples above were measured by a method according to JIS K 7361 using a haze meter HM-150 (Murakami).

Measurement of Haze Value

The haze values (Hz) of the visibility improving films for display panels produced in the examples and comparative examples were measured by a method according to JIS K 7136 using a haze meter HM-150 (Murakami)

Measurement of White Turbidity Ratio

When the visibility improving film for a display panel of Comparative Example 7 was bonded to a glass slide using an adhesive film, placed on a black acrylic plate, and kept under the condition of 9 lx, the luminance value measured at a height of 7 cm from the front side was obtained (A3), the visibility improving films for display panels of the examples and comparative examples were bonded to a glass slide by the same method, and the luminance value measured under the same conditions was obtained (B3), and then the luminance values measured in the respective examples and comparative examples were matched to calculate the white turbidity ratio. (Measuring equipment: Konica Minolta, CA-210).

Measurement of Luminance Ratio

The visibility improving film for a display panel of Comparative Example 7 was bonded to a glass slide using an adhesive film and placed on top of the LCD panel which was powered, and the luminance value measured at a height of 5.5 cm from the front side was obtained (A2), the visibility improving films for display panels of the examples and comparative examples were bonded to a glass slide by the same method, and the luminance value measured under the same conditions was obtained (B2), and then the luminance values measured in the respective examples and comparative examples were matched to calculate the luminance ratio. (Measuring equipment: Konica Minolta, CA-210, LCD panel: 4.7 inches, Gray scale 255, 297.2 cd/m2).

Measurements were carried out in a dark room below 3.5 lx.

Evaluation of Laser Pointer Visibility

When the visibility improving film for a display panel of Comparative Example 7 was bonded to a glass slide using an adhesive film, placed on a black acrylic plate, and then irradiated with a 535-nm laser at 45° with respect to the normal direction, the luminance value measured from the front side was obtained (A1), the visibility improving films for display panels of the examples and comparative examples were bonded to a glass slide by the same method, and the luminance value measured under the same conditions was obtained (B1), and then the luminance values measured in the respective examples and comparative examples were matched to calculate the visibility evaluation value. (Measuring equipment: Konica Minolta, CA-210, laser pointer: 3M, LP-7000).

Measurements were carried out in a dark room below 3.5 lx.

The measurement results are summarized in Table 2 below.

TABLE 2

| Note | Tt | Hz | White turbidity ratio | Luminance ratio (%) | Visibility |
|---|---|---|---|---|---|
| Example 1 | 86.7 | 3.9 | 2 | 94.7 | 4.73 |
| Example 2 | 85.7 | 4.9 | 2.33 | 93 | 5.58 |
| Example 3 | 83.5 | 6.7 | 3 | 90 | 9.23 |
| Example 4 | 81.6 | 8.1 | 3.67 | 88.3 | 10.25 |
| Comparative Example 1 | 88.6 | 4.6 | 1 | 95.6 | 2.05 |
| Comparative Example 2 | 86.5 | 6.4 | 1.33 | 93.3 | 3.15 |
| Comparative Example 3 | 77.6 | 15.7 | 2.67 | 82.2 | 7.25 |
| Comparative Example 4 | 90.8 | 4.8 | 1.33 | 98.41 | 2.25 |
| Comparative Example 5 | 87.5 | 16.2 | 4.33 | 90.36 | 10.98 |
| Comparative Example 6 | 86.4 | 19.2 | 5.33 | 86.47 | 14.19 |
| Comparative Example 7 | 90.4 | 22.1 | 1 | 100 | 1 |
| Comparative Example 8 | 88.1 | 3.11 | 1.65 | 96.3 | 3.47 |
| Comparative Example 9 | 89.1 | 2.45 | 1.39 | 97.1 | 2.51 |

Referring to Table 2 above, it can be clearly confirmed that as the visibility improving films for display panels according to the examples of the present invention use specific metal-coated inorganic oxide fine particles in a certain range, they have very high transmittance values while having relatively low haze values of the films, and that they have high luminance ratio values while having relatively low white turbidity values as compared with the films of the comparative examples and the like, thereby enhancing the selective visibility of the laser pointer light while having excellent optical properties as a whole.

On the other hand, it can be seen that in the case of the comparative examples, the effect of improving the selective visibility of the laser pointer light is often not sufficient, and in particular, in the case of Comparative Examples 8 and 9, the effect of improving the visibility does not reach those of the examples of the present invention, despite the use of the same type of particles as used in the examples of the present invention.

In addition, in the other comparative examples, there is also a problem that the selective visibility of the laser pointer light is not good. When the content of each component is adjusted to improve the visibility, aspects that compromise other optical properties are rather increased, such as the transmittance value being largely lowered or the haze value being greatly increased. Therefore, it can be clearly confirmed that it is very difficult to simultaneously improve the physical properties such as selective visibility of the laser pointer light, transmittance, haze, white turbidity, luminance ratio, and the like, as in Examples of the present invention.

The invention claimed is:

1. A visibility improving film for a display panel, comprising: a substrate; and a photocured resin layer provided on at least one side of the substrate, wherein the photocured resin layer is formed from a photocurable resin and metal-coated glass particles having an average particle size of 3 to 6 μm and a flattening ratio of 0.5 or more dispersed in the photocurable resin, and wherein the visibility improving film improves visibility of a laser pointer light on the display panel compared with a display panel without the film and has a visibility evaluation value relative to a reference film as represented by Formula 1 of at least 9.23, Visibility Evaluation Value=$B1/A1$ [Formula 1]

wherein, in the Formula 1,

A1 is a luminance value measured from the front side of the reference film bonded to a glass slide, then placed on a black acrylic plate by irradiating a laser light at 45° with respect to the normal direction, the reference film having a transmittance of 80 to 100 as measured according to JIS K 7361 and a haze value of 20 to 25 as measured according to JIS K 7136, and B1 is a luminance value measured from the front side of the visibility improving film for a display panel bonded to a glass slide, then placed on a black acrylic plate by irradiating the same laser light at 45° with respect to the normal direction, wherein the metal-coated glass particles are silver-coated glass particles, wherein the photocured resin layer includes the metal-coated glass particles contained in an amount of 7.1 to 20 parts by weight based 100 parts by weight of the photocurable resin, and, wherein the film has a haze value measured according to JIS K 7136 of 15% or less.

2. The visibility improving film for a display panel according to claim 1, wherein a value of luminance ratio represented by Formula 2 is 80% or more:

Luminance Ratio=$(B2/A2)*100$ [Formula 2]

wherein, in the Formula 2,

A2 is a luminance value measured from the front side of a reference film bonded to a glass slide and then placed on a backlight surface, wherein the film has a transmittance of 80 to 100 as measured according to JIS K 7361 and a haze value of 20 to 25 as measured according to JIS K 7136, and B2 is a luminance value measured from the front side of the visibility improving film for a display panel bonded to a glass slide and then placed on a backlight surface.

3. The visibility improving film for a display panel according to claim 1, wherein a white turbidity value represented by Formula 3 is 10 or less:

White Turbidity Ratio=$B3/A3$ [Formula 3]

wherein, in Formula 3,

A3 is a luminance value (cd/m2) measured at a height of 7 cm from the front side of a reference film bonded to a glass slide and then placed on a black acrylic plate and kept under the condition of 9 lx, and wherein the reference film has a transmittance of 80 to 100 as measured according to JIS K 7361 and a haze value of 20 to 25 as measured according to JIS K 7136, and B3 is a luminance value (cd/m2) measured at a height of 7 cm from the front side, when the visibility improving film for a display panel is bonded to a glass slide, then placed on a black acrylic plate and kept under the condition of 9 lx.

4. The visibility improving film for a display panel according to claim 1, wherein the metal-coated glass particles contain 5 to 50 wt % of silver.

5. The visibility improving film for a display panel according to claim 1, wherein the photocured resin layer includes the metal-coated glass particles contained in an amount of 7.1 to 10 parts by weight based 100 parts by weight of the photocurable resin.

6. The visibility improving film for a display panel according to claim 1, wherein the photocured resin layer has a thickness of 2 to 20 μm.

7. The visibility improving film for a display panel according to claim 1, wherein the film has a light transmittance measured according to JIS K 7361 is 80 or more.

8. The visibility improving film for a display panel according to claim 1, the film has a pencil hardness of HB or more at a load of 500 g.

9. The visibility improving film for a display panel according to claim 1, wherein the substrate includes at least one of glass, polyethylene terephthalate (PET), ethylene vinyl acetate (EVA), a cyclic olefin polymer (COP), a cyclic olefin copolymer (COC), polyacrylate (PAC), polycarbonate (PC), polyethylene (PE), poly(methylmethacrylate) (PMMA), polyether ether ketone (PEEK), polyethylene naphthalate (PEN), polyetherimide (PEI), polyimide (PI), MMA (methyl methacrylate), a fluorocarbon resin, and triacetylcellulose (TAC).

10. A display device comprising a display panel and the visibility improving film for a display panel of claim 1 on the display panel.

11. A display panel comprising the visibility improving film for a display panel of claim 1 on the display panel.

* * * * *